Oct. 7, 1952      F. McD. SELLARS      2,613,052
DEVICE FOR THE ATTACHMENT OF LAMPS TO MOTOR VEHICLES
Filed Jan. 5, 1950      2 SHEETS—SHEET 1

Inventor
Fred McDuff Sellars
By Ferdinand Broster Bosshardt
Attorney

Oct. 7, 1952 F. McD. SELLARS 2,613,052
DEVICE FOR THE ATTACHMENT OF LAMPS TO MOTOR VEHICLES
Filed Jan. 5, 1950 2 SHEETS—SHEET 2

Inventor
Fred McDuff Sellars.
By
Ferdinand Broster Bosshardt
Attorney

Patented Oct. 7, 1952

2,613,052

UNITED STATES PATENT OFFICE 2,613,052

DEVICE FOR THE ATTACHMENT OF LAMPS TO MOTOR VEHICLES

Fred McDuff Sellars, Rochdale, England

Application January 5, 1950, Serial No. 136,870
In Great Britain February 3, 1949

2 Claims. (Cl. 248—214)

This invention relates to devices for the attachment of lamps to motor and other power propelled vehicles and has for its main object to provide a construction of device which enables supplementary lamps, such as spotlight lamps and reversing lamps to be quickly and easily fitted to motor vehicles without requiring the drilling of fixing holes and the removal of fixing means and which enables the lamps to be set with their light beams at different heights and pointing in different directions, whilst being free from shake or material vibration in use and enabling the lamps to be attached and adjusted preferably with the aid of only one small key.

According to my invention a device for the attachment of a lamp, particularly a supplementary lamp to a motor or other power propelled vehicle comprises a three-part clamp applicable to a bar on the vehicle, and a pillar carried by and slidable and rotatable on the clamp, the pillar being adapted to have the lamp mounted on it.

The three-part clamp preferably comprises a jaw of channel section having a lug in which the pillar is slidable and rotatable, a second separate jaw of channel section whose ends are directed inwards to engage the back of the first jaw, and a clamping screw engaging a screw-threaded hole in the second jaw and a boss on the second jaw, a screw being provided on the lug for fixing the pillar.

The screws preferably have in their ends axial, flat sided holes of the same size for engagement by a single small key whereby the screws can be tightened and slackened.

The pillar preferably has at its end an offset platform provided with a hole to receive a screw-threaded lamp spigot. The hole may have a removable bush, associated therewith for adapting the hole to a screw-threaded lamp spigot of smaller diameter.

I attain the said object by the device illustrated in the accompanying drawings, wherein—

Figure 1:
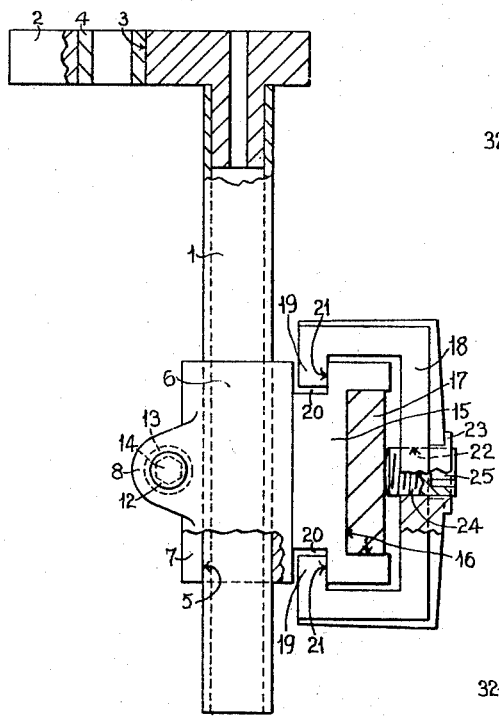
Figure 1 is a side view, partly in section, of a device for the attachment of a lamp to a motor or other power propelled vehicle.
Figure 2:
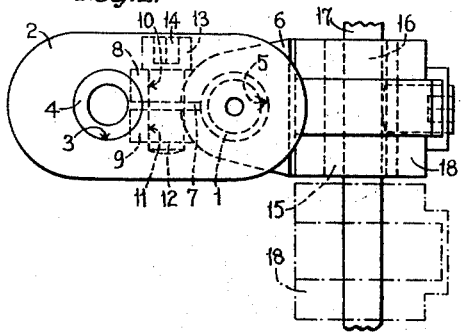
Figure 2 is a plan view thereof.

Referring to the drawings, in the construction shown in Figures 1 and 2, a cylindrical hollow pillar has at its upper end a fixed arm 2 forming a platform for a spotlight lamp (not shown). The arm has a vertical hole 3 to receive the vertical, screw-threaded spigot usually provided on the lamp for attachment purposes. A loose bush 4 fitting the hole 3 is provided for use in the hole 3 where the spigot provided on the lamp is of substantially smaller diameter than the hole 3. The lamp is secured on the arm by a nut screwed onto the spigot at the underside of the arm 2, a washer being provided between the nut and the said underside.

The pillar 1 is slidable and rotatable in a vertical hole 5 in a lug 6. The lug 6 is split at 7 from top to bottom and has two ears 8 and 9 respectively at the sides of the split. The lug 8 has a clearance hole 10 and the lug 9 a screw-threaded hole 11 for a screw 12 which has a head 13 provided with a hexagonal axial hole 14 to receive a hexagonal key. After the pillar has been adjusted up or down or circularly in the lug 6 it can be fixed to the lug by tightening the screw 12 by means of the key and thereby causing the split lug to clamp the pillar.

The lug 6 is provided on a jaw 15 which has a horizontal channel 16 to accommodate one of the bars arranged horizontally with its wider sides vertical and employed on a vehicle to attach bumpers thereto, a portion of one such bar being shown by way of example and marked 17.

The channel 16 is sufficiently wide and deep to accommodate the largest size of bar usually employed. The floor of the channel 16 is vertical. The jaw 15 forms one jaw of a clamp the other jaw 18 of which is separate and has opposed, inwardly directed flanges 19 slid laterally into channels 20 provided behind the jaw 15 so as to be hooked round the jaw 15 and engage shoulders 21 on the back of the jaw 15. The separate jaw 18 has a horizontal screw-threaded hole 22 which extends through a boss 23 provided on the outer side of the jaw 18 and is furnished with a clamping screw 24.

The screw 24 has a hexagonal, axial hole 25 in its outer end to receive the same key as is employed to rotate the screw 12, the hole and key being of relatively small size.

To attach the lamp, the jaw 15 is placed and held on the bumper securing bar 17 so that the floor of its channel rests against one vertical face of the bar 17. The jaw 18 is brought into position at one side of the jaw 15, as indicated in dot-and-dash lines in Figure 2, so that the floor of its channel faces the other vertical face of the bar 17 and is thereupon moved sideways towards and onto the jaw 15 so that its flanges 19 engage the channels 20 behind the jaw 15 and it therefore cannot leave the jaw 15. The clamping screw 24 is then tightened and its inner end thereby forced against the second named vertical face of the bar 17 to clamp the jaws 15 and 18 to the bar 17. The lamp is then mounted on the arm 2 and the pillar 1 adjusted vertically and circularly to throw the light beam of the lamp in the desired direction and at the desired direction and at the desired elevation. The screw 12 is then tightened to secure the pillar 1 in the adjusted position.

The hereinbefore described device renders it unnecessary to drill a hole in the bar 17 or disconnect it from the bumper or the vehicle. It enables lamps of different makes, after mounting on the arm 2, to be attached to bars of different dimensions without structural alterations and it also makes it easy for an unskilled person to attach and adjust the position of the lamp with the use only of a single small key. It furthermore provides a strong and firm attachment of such robustness that the lamp does not shake or vibrate materially and therefore has a steady beam when the vehicle is travelling.

The device can be applied with equal facility to the front or rear of the vehicle for attachment of a spotlight lamp to serve as a spotlight or a reversing light.

Figure 3:
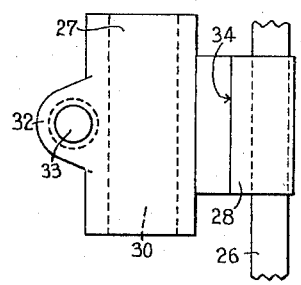
Figure 3 is a side view of a detail and illustrates a further construction of the said detail.
Figure 4:
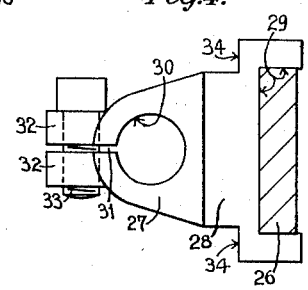
Figure 4 is a plan view of Figure 3.

For attachment to a vertical bar provided on a vehicle, for example the vertical bar 26, Figures 3 and 4, the lug 6 and jaw 15 of the device is replaced by a lug 27 with jaw 28 a bar channel 29 of which is parallel with a hole 30 provided in the lug 27 for engagement with the pillar 1. The lug 27 is split at 31 and has ears 32 and a headed screw 33 similar to the screw 12 and serving to clamp the lug 27 to the pillar 1. The jaw 18 of Figures 1 and 2, but turned angularly 90 degrees, is slid into position on the jaw 28 from above or below the same until its flanges register with the shoulders 34 behind the jaw 28 whereupon the screw 24 is tightened to clamp the jaw 18 and the jaw 28 to the bar 26.

Figure 5:
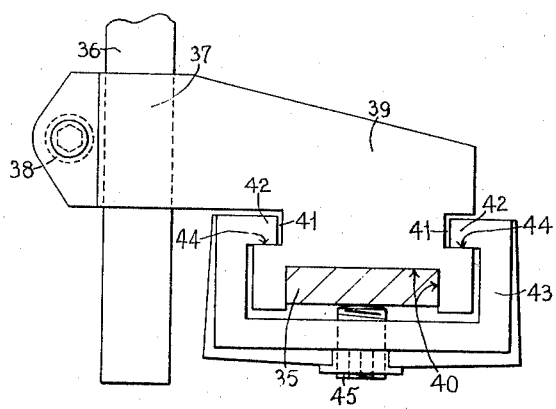
Figure 5 is a fragmentary side view of a device for the attachment of a lamp to a motor or other power propelled vehicle and illustrates another construction.
Figure 6:
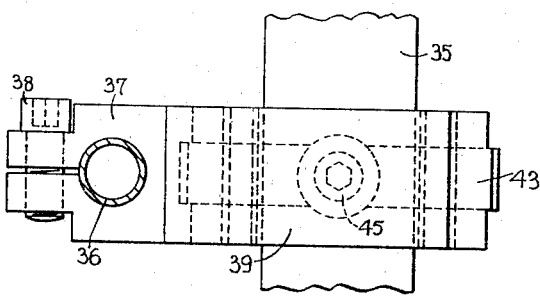
Figure 6 is a plan view of Figure 5.
Figure 7:
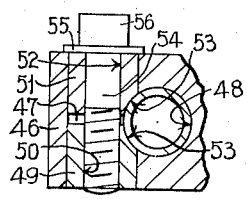
Figure 7 is a fragmentary plan view in section of a detail and illustrates a modification.

The construction shown in Figures 5 and 6 is for attachment of a lamp to a bar, for example the bar 35, arranged on a motor or other power propelled vehicle horizontally with its wider sides horizontal. The device has a pillar 36 with platform similar to the pillar 1 with platform 2 of Figure 1, for connection to the lamp. The pillar 36 is slidable and rotatable in a vertical hole in a split lug 37 having a screw 38 whereby it can be tightened to grip the pillar 36 in the adjusted position. The lug 37 is provided on a jaw 39 having a channel 40 to receive the bar 35. The floor of the channel 40 is horizontal and therefore at right angles to the pillar 36. The jaw 39 has slots 41 to accommodate inwardly projecting flanges 42 of a separate jaw 43 and form shoulders 44 for engagement by the flanges 42. The jaw 43 has a clamping screw 45 whereby the bar 40 can be clamped between the jaws 39 and 43 after the jaw 43 has been slid laterally into position on the jaw 39.

In all the hereinbefore described constructions, instead of a split lug to receive the pillar and a screw for clamping the lug on the pillar, a non-split lug may be provided having a hole to receive the pillar, and a set screw may be provided on the lug to secure the pillar in its adjusted position in the hole.

Another alternative means of securing the pillar in its adjusted position consists of a non-split lug 46 provided on the clamp and having a cross hole 47 which breaks into the hole 48 in which the pillar is mounted. The cross hole 47 contains a slidable bush 49 having an axial screw-threaded hole 50 and a slidable bush 51 having an axial clearance hole 52. The bushes have recesses 53 to accommodate the pillar. A headed screw 54 extends through the bush 51 and screws into the bush 49. A washer 55 is interposed between the head 56 of the screw 54 and the lug 46. By screwing the screw 54 tight, the bush 49 is caused to press against the pillar at its recess 53 and thereby clamp the pillar to the lug 46. This device ensures great strength of security of the pillar irrespective of whether the lug is of soft metal or not.

I claim:

1. A device for the attachment of a lamp to a bar of a power propelled vehicle, comprising a jaw of channel section, a lug on the said jaw and having a hole, a pillar slidable and rotatable in the said hole, a second, separate jaw of channel section, inwardly directed flanges on the second jaw for engagement with the back of the first named jaw, a boss on the second jaw, the second jaw and boss having a screwthreaded hole, a clamping screw engaging the screwthreaded hole for clamping the engaged jaws to the bar, and a screw on the lug for fixing the pillar to the lug, the clamping screw and last named screw having tightening key holes of the same size.

2. A device for the attachment of a lamp to a bar of a power propelled vehicle, comprising a three-part clamp applicable to the said bar in situ and having a hole and a cross hole which breaks into the said hole, a pillar slidable in the said hole for attachment to the lamp, an internally screw-threaded bush and a bush having a clearance hole slidably engaged with the cross hole, recesses in the bushes to accommodate the pillar, and a headed screw extending through the second named bush and screwed into the first named bush for forcing the second named bush into binding contact with the pillar and thereby securing the pillar against rotating and sliding in the clamp.

FRED McDUFF SELLARS.

REFERENCES CITED

The following references are of record in the file of this patent:

UNITED STATES PATENTS

| Number | Name | Date |
|---|---|---|
| 1,911,380 | McFarlin | May 30, 1933 |
| 2,294,040 | Metcalf | Aug. 25, 1942 |

FOREIGN PATENTS

| Number | Country | Date |
|---|---|---|
| 336,851 | Italy | Dec. 10, 1934 |